United States Patent
Mihalache et al.

(10) Patent No.: US 10,437,949 B1
(45) Date of Patent: Oct. 8, 2019

(54) SCHEDULING EVENTS IN HARDWARE DESIGN LANGUAGE SIMULATION

(71) Applicant: Xilinx, Inc., San Jose, CA (US)

(72) Inventors: Valeria Mihalache, Los Gatos, CA (US); Kumar Deepak, San Jose, CA (US); Saikat Bandyopadhyay, San Jose, CA (US)

(73) Assignee: XILINX, INC., San Jose, CA (US)

( * ) Notice: Subject to any disclaimer, the term of this patent is extended or adjusted under 35 U.S.C. 154(b) by 128 days.

(21) Appl. No.: 15/676,104

(22) Filed: Aug. 14, 2017

(51) Int. Cl.
*G06F 9/455* (2018.01)
*G06F 17/50* (2006.01)

(52) U.S. Cl.
CPC ...... *G06F 17/5022* (2013.01); *G06F 2217/02* (2013.01)

(58) Field of Classification Search
USPC .......... 716/104, 106, 108, 111, 113; 714/33; 703/14, 16
See application file for complete search history.

(56) References Cited

U.S. PATENT DOCUMENTS

| | | | | |
|---|---|---|---|---|
| 5,841,967 A * | 11/1998 | Sample | ............... | G06F 17/5027 714/33 |
| 6,339,751 B1 * | 1/2002 | Takeda | ................ | G06F 17/5022 703/16 |
| 6,466,898 B1 * | 10/2002 | Chan | ................... | G06F 17/5022 703/14 |
| 2010/0146338 A1 * | 6/2010 | Schalick | ............. | G06F 11/3648 714/33 |
| 2013/0304450 A1 * | 11/2013 | Tsai | ..................... | G06F 17/5022 703/14 |
| 2014/0282312 A1 * | 9/2014 | Stamness | ............ | G06F 17/5022 716/106 |

OTHER PUBLICATIONS

Xilinx, "ISim User Guide," UG660 (v14.1), Apr. 24, 2012, pp. 1-156, Xilinx, Inc., San Jose, California, USA.

* cited by examiner

*Primary Examiner* — Brian Ngo
(74) *Attorney, Agent, or Firm* — Kevin T. Cuenot

(57) ABSTRACT

Simulating a circuit design can include detecting, using a processor, an assignment for a signal of a circuit design during a delta cycle of a simulation of the circuit design and comparing, using the processor, a range of the assignment for the signal with a range of an existing event for the signal for the delta cycle. In response to determining that the range of the assignment for the signal and the range of the existing event meet a condition, the existing event is updated, using the processor, resulting in a merged event. The merged event is scheduled for execution for the delta cycle using the processor.

20 Claims, 3 Drawing Sheets

SCHEDULING EVENTS IN HARDWARE DESIGN LANGUAGE SIMULATION

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to circuit design and, more particularly, to simulating circuit designs specified in a hardware description language.

BACKGROUND

Designers of digital circuits rely upon computer aided techniques. Standard hardware description languages (HDLs) such as Verilog, System Verilog, and VHDL have been developed that are used to describe digital circuits. HDLs allow a designer to create a definition of a digital circuit design at the gate level, the register transfer level (RTL), or the behavioral level using abstract data types. A circuit design specified in an HDL may be processed by a computer-aided design tool for implementation as, or within, an integrated circuit.

HDL simulation is a technique for testing the behavior of hardware that is implemented from a circuit design specified in HDL. HDL simulation involves building an executable model of the circuit design originally specified in HDL. The circuit design is often referred to as the "design under test" or "DUT". The resulting executable version of the circuit design is then executed in combination with an HDL simulator using a data processing system.

In general, HDL simulation includes two phases. The first phase is referred to as compilation. During compilation, the DUT is parsed, elaborated, and executable program code is generated from the DUT. The second phase is a runtime phase where the executable program code generated during compilation is loaded into memory of a data processing system and executed.

SUMMARY

One or more embodiments are directed to methods for simulating a circuit design. In one aspect, a method can include detecting, using a processor, an assignment for a signal of a circuit design during a delta cycle of a simulation of the circuit design, comparing, using the processor, a range of the assignment for the signal with a range of an existing event for the signal for the delta cycle, and, in response to determining that the range of the assignment for the signal and the range of the existing event meet a condition, updating, using the processor, the existing event resulting in a merged event. The method can also include scheduling, using the processor, the merged event for execution for the delta cycle.

One or more embodiments are directed to systems for simulating a circuit design. In one aspect, a system includes a memory configured to store program code and a processor coupled to the memory. The processor, in response to executing the program code, is configured to initiate operations. The operations include detecting an assignment for a signal of a circuit design during a delta cycle of a simulation of the circuit design, comparing a range of the assignment for the signal with a range of an existing event for the signal for the delta cycle, and, in response to determining that the range of the assignment for the signal and the range of the existing event meet a condition, updating the existing event resulting in a merged event. The operations further can include scheduling the merged event for execution for the delta cycle.

One or more embodiments are directed to computer program products for simulating a circuit design. In one aspect, a computer program product includes a computer readable storage medium having program code stored thereon. The program code is executable by a processor to perform operations including detecting, using the processor, an assignment for a signal of a circuit design during a delta cycle of a simulation of the circuit design, comparing, using the processor, a range of the assignment for the signal with a range of an existing event for the signal for the delta cycle, and, in response to determining that a range of the assignment for the signal and the range of the existing event meet a condition, updating, using the processor, the existing event resulting in a merged event. The operations can also include scheduling, using the processor, the merged event for execution for the delta cycle.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION OF THE DRAWINGS

Figure 1:
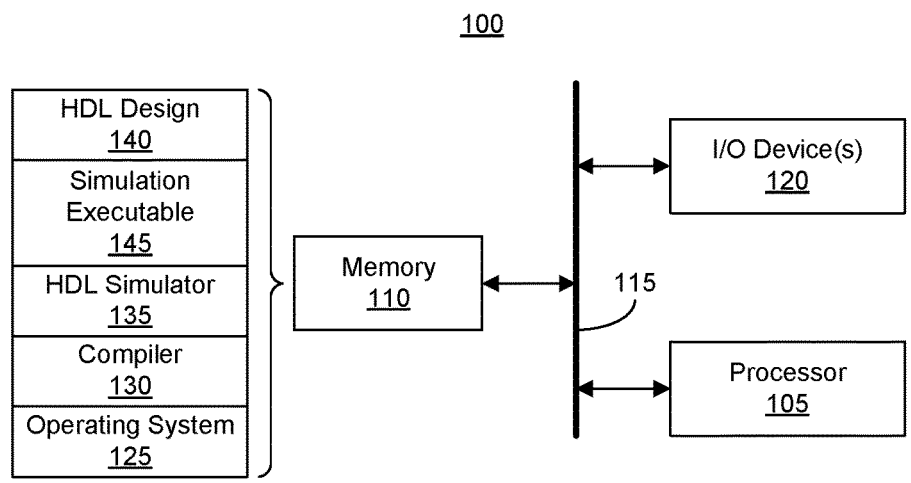
FIG. 1 illustrates an example of a data processing system for use with one or more embodiments described herein.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to circuit design and, more particularly, to simulating circuit designs specified in a hardware description language (HDL). One or more embodiments described within this disclosure are directed to HDL simulation of a design under test (DUT) and facilitate increased runtime performance of the HDL simulation. Increased runtime performance, e.g., faster execution of the HDL simulation, is achieved, at least in part, through high-performance scheduling of HDL events during the HDL simulation.

In many cases, a DUT is compiled one time and then executed using an HDL simulator many times. During runtime of an HDL simulation, for a given clock cycle of the DUT, referred to herein as "simulation time," a large number of HDL events often occur and are executed. For example, in a single clock cycle of the DUT in an HDL simulation, several thousand HDL events may be executed.

A clock cycle of an HDL simulation may be divided into two or more "delta cycles". A delta cycle is a group of HDL events (hereafter "events") that occur on or during a same clock cycle of the DUT for the HDL simulation. Delta cycles may be ordered so that a first group of events, corresponding to a first delta cycle of a clock cycle of the HDL simulation, is executed prior to a second group of events, corresponding to a second delta cycle of the clock cycle of the HDL simulation. Within a given delta cycle, the events of that delta cycle may be executed by the HDL simulator in any order. Thus, while delta cycles are processed in a specified order, when processing a given delta cycle of a DUT clock cycle, the events of the delta cycle can be executed in any order. In general, delta cycles are one way of ordering the large number of events that are to be executed for a given clock cycle of the DUT during HDL simulation.

During runtime of an HDL simulation, each delta cycle can include two general phases. The two phases are an update phase and an execute phase. Simulation time is advanced during the update phase. Further, signal values are updated based upon the scheduled transactions for the current simulation time. During the HDL simulation, changes in signal values may trigger events. The triggered events, in turn, cause processes sensitive to the events to be executed. Additional processes that were suspended by wait statements resume execution when the current simulation time reaches the value required by the wait statements. The runtime component of an HDL simulator that schedules events to be executed is called a "scheduler".

In many HDL simulations of DUTs, there may be thousands, tens of thousands, or possibly hundreds of thousands of events scheduled for a given delta cycle. Each event that is generated takes time and computing resources of the data processing system performing the HDL simulation to schedule. Therefore, the performance of the scheduler in scheduling events can have a significant impact upon the overall runtime performance of the HDL simulator.

In particular embodiments, a scheduler of an HDL simulator is capable of merging events of a same signal that belong to a same delta cycle. In general, events scheduled for a given delta cycle are placed into an event queue. As discussed, the number of events is often on the order of thousands, tens of thousands, or even hundreds of thousands. Scheduling an event involves placing the event in the event queue and subsequently fetching the event from the event queue when the event is to be executed during runtime of the HDL simulation. Scheduling, e.g., the storing, subsequent recall, and execution, of each event incurs a runtime cost. By reducing the number of events that are placed in the event queue as described herein, the runtime performance of the HDL simulator is increased.

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example of a data processing system (system) 100 for use with one or more embodiments described herein. In an aspect, system 100 is implemented as a computer or other system or device that is suitable for storing and/or executing program code. System 100 is capable of compiling an HDL design and/or simulating the compiled HDL design as described herein.

System 100 includes at least one processor 105. Processor 105 is coupled to memory 110 through interface circuitry 115. System 100 stores computer readable instructions (also referred to as "program code") within memory 110. Memory 110 is an example of computer readable storage media. Processor 105 executes the program code accessed from memory 110 via interface circuitry 115.

Memory 110 includes one or more physical memory devices such as, for example, a local memory and one or more bulk storage devices. The term "local memory" refers to non-persistent memory device(s) generally used during actual execution of the program code. Examples of local memory include random access memory (RAM) and/or any of the various types of RAM that are suitable for use by a processor during execution of program code. The term "bulk storage device" refers to persistent data storage devices. Examples of a bulk storage device include a hard disk drive (HDD) and a solid-state drive (SSD). System 100 may also include one or more cache memories (not shown) that provide temporary storage of at least some program code to reduce the number of times program code must be retrieved from a bulk storage device during execution.

Examples of interface circuitry 115 include, but are not limited to, an input/output (I/O) subsystem, an I/O interface, a bus system, and a memory interface. For example, interface circuitry 115 may be one or more of any of several types of bus structures, including a memory bus or memory controller, a peripheral bus, an accelerated graphics port, and a processor or local bus using any of a variety of bus architectures. By way of example, and not limitation, such bus architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

System 100 further may include one or more input/output (I/O) devices 120 coupled to interface circuitry 115. I/O devices 120 may be coupled to system 100, e.g., interface circuitry 115, either directly or through intervening I/O controllers. Examples of I/O devices 120 include, but are not limited to, a keyboard, a display device, a pointing device, one or more communication ports, and a network adapter. A network adapter refers to circuitry that enables system 100 to become coupled to other systems, computer systems, remote printers, and/or remote storage devices through intervening private or public networks. Modems, cable modems, Ethernet cards, and wireless transceivers are examples of different types of network adapters that may be used with system 100.

Memory 110 stores program code. For example, memory 110 is capable of storing one or more program modules. The program modules may generally include routines, programs, objects, components, logic, data structures, and so on. For purposes of illustration, memory 110 stores an operating system 125, a compiler 130, and an HDL simulator 135. Memory 135 further is capable of storing an HDL design 140 and a simulation executable 145, which is an executable version of HDL design 140. In one or more embodiments, memory 110 is capable of storing an Electronic Design Automation (EDA) application. The EDA application is capable of performing a design flow (e.g., synthesis, placement, routing, and/or configuration bitstream generation) on HDL design 140.

In an aspect, operating system 125, compiler 130, HDL simulator 135, and simulation executable 145, being implemented in the form of executable program code, are executed by system 100 and, more particularly, by processor 105, to perform the operations described within this disclosure. As such, operating system 125, compiler 130, HDL simulator 135, and simulation executable 145 may be considered an integrated part of system 100. Further, it should be appreciated that any data used, generated, and/or operated upon by system 100 (e.g., processor 105) are functional data structures that impart functionality when employed as part of system 100.

System 100 may include fewer components than shown or additional components not illustrated in FIG. 1 depending upon the particular type of device and/or system that is implemented. In addition, the particular operating system and/or application(s) included may vary according to device and/or system type as may the types of I/O devices included. Further, one or more of the illustrative components may be incorporated into, or otherwise form a portion of, another component. For example, a processor may include at least some memory.

System 100 may be implemented as any of a variety of computer systems. In one or more embodiments, system 100 is formed of two or more networked computer systems. In particular embodiments, the operations described herein and attributed to system 100 and/or processor 105 are performed using a cloud computing environment that uses one or more networked computer systems to implement one or more virtual servers.

As used herein, the term "cloud computing" may refer to a computing model that facilitates convenient, on-demand network access to a shared pool of configurable computing resources such as networks, servers, storage, applications, and/or services. These computing resources may be rapidly provisioned and released with minimal management effort or service provider interaction. Cloud computing promotes availability and may be characterized by on-demand self-service, broad network access, resource pooling, rapid elasticity, and measured service. Cloud computing generally supports service models such as Cloud Software as a Service (SaaS), Cloud Platform as a Service (PaaS), and/or Cloud Infrastructure as a Service (IaaS). Cloud computing further may support deployment models such as Private cloud, Community cloud, Public cloud, and/or Hybrid cloud. Further information relating to cloud computing may be obtained from the National Institute of Standards and Technology (NIST) and, more particularly, the Information Technology Laboratory of NIST.

In general, system 100 is capable of executing compiler 130 to perform the first phase of HDL simulation called compilation. Compiler 130, when executed and provided HDL design 140 as input, compiles HDL design 140. For example, compiler 130 parses and elaborates HDL design 140. Further, compiler 130 is capable of parameterizing one or more modules of HDL design 140. Compiler 130, in elaborating HDL design 140, creates an instance of each parameterized module that has a different parameterization.

For example, HDL design 140 may include more than one adder, where a first adder is parameterized as a 16-bit adder and a second adder is parameterized as a 32-bit adder. In that case, compiler 130 creates a 16-bit adder and a 32-bit adder (e.g., in executable program code) through elaboration. In another example, two adders may be the same size (e.g., both be 16-bit or both be 32-bit). In that case, the first adder may operate on a first set of signals, while the second adder operates on different signals. In that case, compiler 130 is capable of generating executable program code representing the first adder and executable program code (e.g., separate and independent program code) representing the second adder.

Compiler 130 is also capable of generating simulation executable 145. Compiler 130 is capable of generating object code for each unique module instance from elaboration and linking the generated object codes with a simulation engine library (not shown) to create simulation executable 145. Simulation executable 145 is an executable version of HDL design 140. HDL simulator 135 is executed and is capable of executing simulation executable 145 to perform HDL simulation of HDL design 140.

Figure 2:
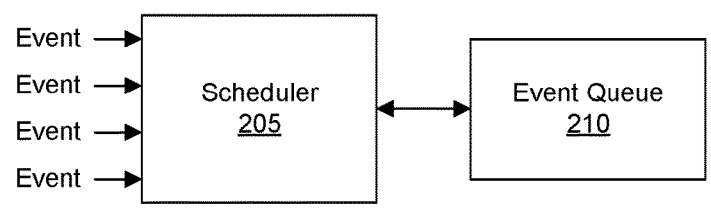
FIG. 2 illustrates an example of a scheduler of the hardware description language (HDL) simulator of FIG. 1.

FIG. 2 illustrates an example of a scheduler 205 of HDL simulator 135. In the example of FIG. 2, scheduler 205 is capable of receiving events for a particular delta cycle. As pictured, scheduler 205 receives a plurality of events for the current delta cycle.

Scheduler 205 is capable of evaluating the received events. In response to determining that certain events meet predetermined conditions, scheduler 205 is capable of merging selected ones of the events to form a merged event. Scheduler 205 is capable of performing the evaluation and any merging prior to adding the events to event queue 210.

A list of events for a (e.g., each) signal for the current delta cycle, for example, is provided to scheduler 205. All of the events available for a given delta cycle are known during runtime. Scheduler 205 is capable of operating on the events from the list before adding the event(s) to event queue 210. Merging, as performed by scheduler 205, is performed before event(s) are added to event queue 210. As such, scheduler 205 is capable of merging events that meet predetermined conditions prior to adding the events, including the merged events, to event queue 210 thereby reducing the number of events that are scheduled during runtime.

The events that are not merged and the merged events, once processed by scheduler 205, are scheduled by scheduler 205. Scheduler 205 schedules the events and/or merged events by storing the events and/or merged events in event queue 210 for the current delta cycle. As noted, scheduling an event can include fetching the event and/or merged event from event scheduling queue 210 and executed the event or merged event as the case may be. Combining events to create merged events as described herein reduces the number of events and the amount of scheduling operations to be performed thereby significantly increasing the speed of HDL simulation. As an illustrative and non-limiting example, application of the event merging techniques described herein for HDL simulation has resulted in approximately a 9% improvement in runtime performance (e.g., increase in execution speed) for benchmarked HDL designs.

Example 1 below shows an example portion of HDL. The type of HDL used in the examples within this disclosure is VHDL. VHDL is used for purposes of illustration and is not intended as a limitation. The inventive arrangements described herein may be used with another HDL such as Verilog and/or System Verilog. Example 1 illustrates multiple non-blocking signal assignments inside a process.

Example 1

```
library ieee;
use ieee.std_logic_1164.all;
use ieee.numeric_std.all;
entity PROTO is
end entity;
architecture RTL of PROTO is
signal s: std_logic_vector(0 to 3):="0000";
begin
process(s(3))
begin
   s(2 to 3)<="10";
   s(0)<='1';
   s(3)<='1';
end process;
end;
```

In Example 1, without merging, the signal assignments:

```
s(2 to 3)<="10";
s(0)<='1';
s(3)<='1';
``` result in the generation of 3 events for the delta cycle (e.g., one event for each signal assignment). By applying merging, as described herein, the events corresponding to signal assignments s(2 to 3)<="10"; and s(3)<='1'; are merged since each of these two signal assignments references a same bit position of the same signal. In this regard, the two assignments are said to "overlap" one another as each references a same bit position of a same signal. Overlapping ranges is an example condition that, if detected by the system, results in a merge. The term "range," as used herein in connection with HDL simulation, refers to all or a portion of a signal. The signal may be one that is specified as part of an assignment or an event. As such, a range may be specified in bits, in bytes, or in another suitable unit of measure that indicates some portion or the entirety of a signal.

In particular, s(2 to 3)<="10"; assigns the value of "0" to bit 3 of signal "s". Subsequently, the signal assignment s(3)<='1'; assigns the value of 1 to bit 3 of signal "s". Generally, the latter assignment for a same bit position of a signal is the final or correct assignment for the bit. Thus, in this case, bit 3 of signal "s" is assigned a "1" at the conclusion of the delta cycle. In one or more embodiments, the events corresponding to these signal assignments are merged to create a single merged event that is added to the event queue as opposed to adding two different events (e.g., one event for each of the two assignments said to overlap) to the event queue. Thus, rather than scheduling three events in total for the portion of HDL shown in Example 1, by merging as described, only two events need be scheduled.

HDL designs can include signals that have hundreds or thousands of bits. As such, a given signal may have many, e.g., hundreds or thousands, of signal assignments for different bits, bytes, and/or different ranges of the signal. Often, signal assignments are included, for example, within loops or utilize tables to change hundreds of bits. Without performing any merging, each signal assignment would result in an event that is scheduled for HDL simulation. Using merging, the number of events that are scheduled can be significantly reduced.

Example 2 below shows another example portion of HDL. Example 2 illustrates non-blocking signal assignments for a loop. While Example 2 iterates relatively few times, in other HDL examples, the number of iterations of the loop may cause execution of an assignment statement many times resulting in the generation and scheduling of many different events if not merged. The events that are scheduled, including merged events, for a given delta cycle are executed at the end of the delta cycle prior to beginning a new delta cycle for the HDL simulation.

Example 2

```
library ieee;
use IEEE.std_logic_1164.all;
entity PT is
end PT;
architecture archPT of PT is
subtype small_integer is INTEGER range 0 to 3;
type P_TYPE is array(0 to 3) of small_integer;
signal P_TABLE: P_TYPE;
signal sig: std_logic_vector(3 downto 0):="1011";
signal sigp: std_logic_vector(0 to 3);
begin
P_TABLE<=(3, 1, 0, 2);
Permutation: process(sig, P_TABLE)
begin
   for i in 0 to 3 loop
      sigp(P_TABLE(i))<=sig(i);
   end loop;
end process;
end archPT;
```

For purposes of illustration, Example 2 uses an array for assigning values to bits of signal "p". In other examples, a function may be used to assign values to bits of the signal "p". These values are only ascertainable at compile time of the HDL design. Without performing merging, four events are scheduled for the portion of HDL shown in Example 2. With merging, the scheduler schedules only one event instead of four events since the bit positions 0, 1, 2, and 3 of signal "p" that are assigned values are contiguous or adjacent to one another. Contiguousness and/or adjacency of ranges is another example of a condition that, if detected by the system, results in a merge.

The merging of events thus far is illustrated in connection with a selected signal of the HDL design. It should be appreciated that the merging may be performed for more than one signal, e.g., for multiple different or all signals of a circuit design during HDL simulation thereby further improving runtime performance. Still, events for a given delta cycle may only be combined with other events for the same signal.

Example 3 below shows another example portion of HDL. Example 3 illustrates multiple non-blocking signal assignments to a same signal. Example 3 also illustrates non-blocking signal assignments to record fields.

Example 3

```
library ieee;
use IEEE.std_logic_1164.all;
entity REC is
end entity;
architecture RTL of REC is
type aRecord1 is record
   ReadData: std_logic_vector(15 downto 0);
   TimeOutCnt: std_logic;
```

```
    InitTimeout: std_logic;
  end record;
  type aRecord2 is record
    ReadData: std_logic_vector(15 downto 0);
    TimeOut: std_logic;
  end record;
  type tP0 is record
    L: aRecord1;
    R: aRecrod2;
  end record;
  signal P0: tP0;
  begin
  process(P0.L.TimeOutCnt)
  begin
    P0.L.TimeOutCnt<=P0.R.TimeOut;
    P0.L.ReadData<=P0.R.ReadData;
    P0.L.TimeOutCnt<='1';
  end process;
end;
```

In the portion of HDL in Example 3, the three assignments:

```
P0.L.TimeOutCnt<=P0.R.TimeOut;
P0.L.ReadData<=P0.R.ReadData;
P0.L.TimeOutCnt<='1';
``` result in the generation and scheduling of three events when no merging is applied. With merging applied, only one event is scheduled since ranges of the events from the three assignments, being contiguous (e.g., adjacent) and/or overlapping, can be merged. For example, ReadData is assigned from bits 0 to 15; and TimeOutCnt is assigned to bit 16.

In the case of VHDL processes, one driver is generated for each signal that is assigned within a process. In cases as described in connection with Examples 1, 2, and 3, where multiple signal assignments for a signal are within a process, the VHDL language reference manual requires only one driver to be created per signal per process. Multiple events may be associated with this driver. Each signal assignment triggers a request for scheduling an event. In particular embodiments, the scheduler is capable of first collecting a list of all of the events on a signal that are to be scheduled in the current delta cycle and then schedule the events by first processing the events for merging.

In general, signal assignments are of the form:

```
mysig<=<expression>;
mysig (si to ei)<=<expression>;
mysig (si downto ei)<=<expression>;
```

For every signal assignment, the scheduler evaluates the start index and the end index of the left-hand side of the assignment. In general, the scheduler is capable of generating merged events (e.g., combining events and/or updating an event from an assignment) by merging index ranges for the signal. In one or more embodiments, the scheduler is capable of ensuring that, at all times during runtime of the HDL simulation, there are no two events for a same signal with overlapping and/or adjacent bits in the event scheduling queue for a given delta cycle.

An example implementation of an event that is generated and scheduled during HDL simulation specifies or indicates a particular signal, a start offset, a number of bytes, and a value. The system generates the event as a data structure in memory and includes fields corresponding to the signal, start offset, a size (e.g., a number of bytes or a number of bits of the signal that is to be modified when the event is executed), and value. The signal (signal) specifies the particular signal that is to be modified by execution of the event. The start offset (startOffset) indicates the leftmost offset (e.g., byte or bit position) to be modified when the event is executed. The size (Size) specifies the number of bytes or bits that have to be modified when the event is executed. The value (value) specifies the particular value to be assigned to the associated signal when the event is executed. It should be appreciated that the size can be specified using any suitable measure such as bytes or bits. Depending upon the particular measure used, other quantities such as startOffset may be specified using the same measure for purposes of consistency.

For example, the scheduler is capable of generating an event for the assignment s(2 to 3)<="10"; in Example 1 where signal is "s", startOffset is 2, Size is 2, and value is the value on the right-hand side of the assignment, which is "10" in this example. The scheduler is also capable of generating an event for the assignment s(3)<='1'; where signal is "s", startOffset is 3, Size is 1, and value is '1'.

Figure 3A:
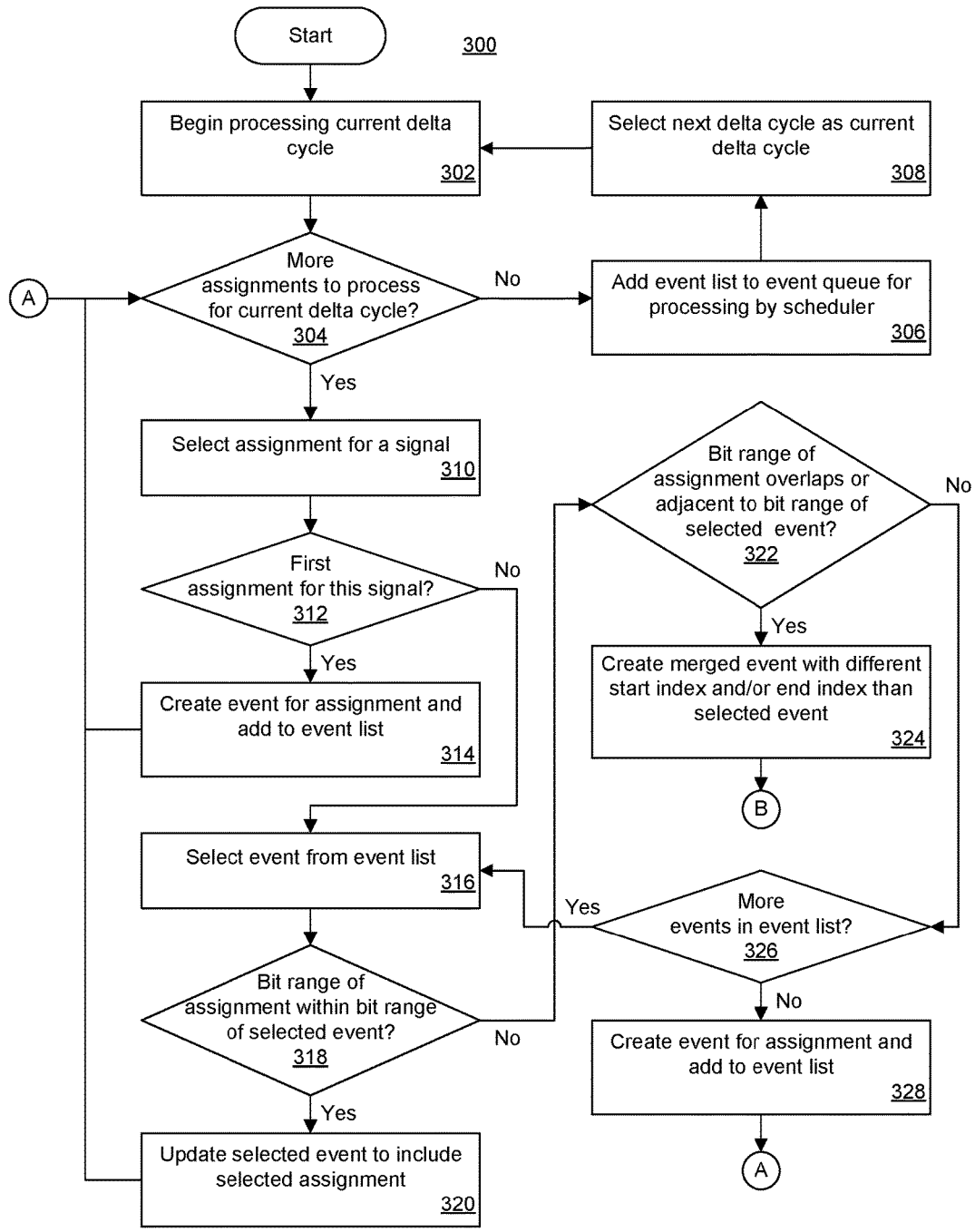
FIGS. 3A and 3B, taken collectively, illustrate an example method of HDL simulation.
Figure 3B:
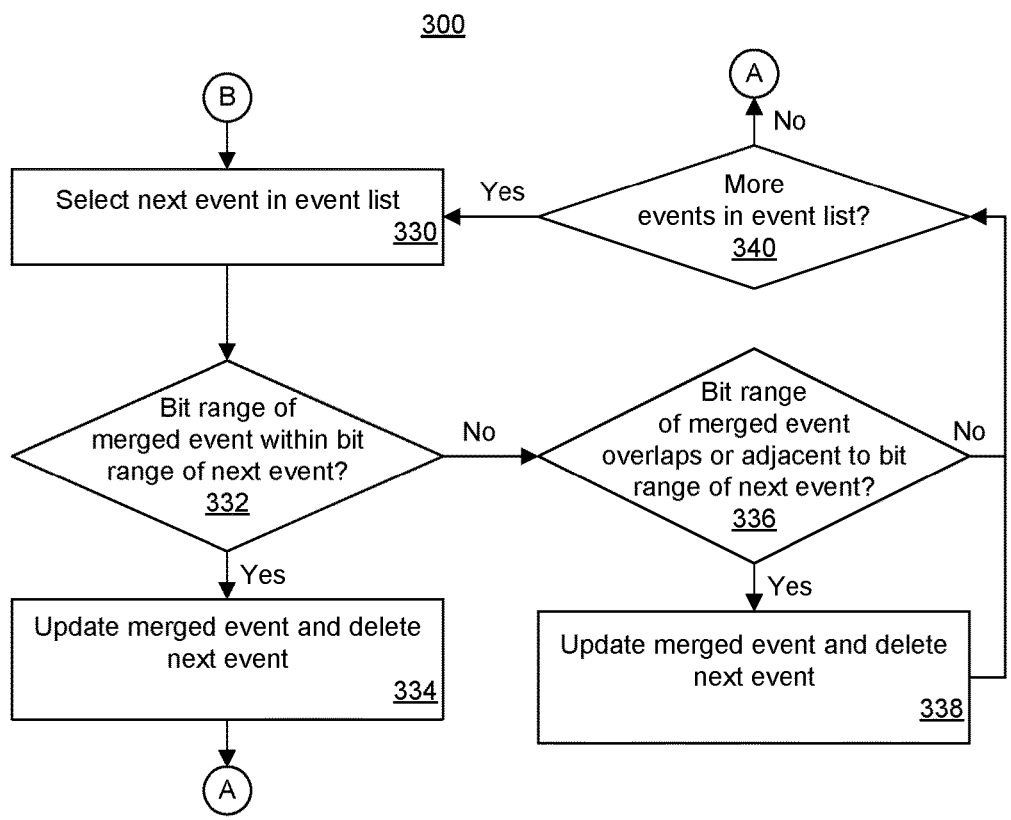

FIGS. 3A and 3B, taken collectively, illustrate an example method 300 of HDL simulation. A system such as system 100 of FIG. 1 is capable of performing method 300. Method 300 is an example of a runtime method for HDL simulation where assignments for signals are processed. More particularly, method 300 begins in a state where an HDL design has undergone compilation as described within this disclosure. The simulation executable is, or has started, executing in combination with the HDL simulator. As part of HDL simulation, the system processes the assignments described herein to generate events. The system, at least initially, adds events to an event list for processing. The system utilizes the event list for processing events and performing merging as described herein prior to adding events from the event list to the event queue. As such, the number of events in the event list that is ultimately added to the event queue (e.g., scheduled) is reduced.

For purposes of illustration, method 300 is described using "bit ranges" for the signals and/or assignments. It should be appreciated, that the ranges may be expressed using any of a variety of suitable measures, e.g., bits or bytes. As such, use of the phrase "bit range" is not intended as a limitation of the example embodiments described.

In block 302, the system begins a delta cycle for a clock cycle of the HDL simulation. For purposes of discussion, the delta cycle started in block 302 is referred to as the "current delta cycle." Each delta cycle may have one or more assignments for signal(s) that are to be processed before moving on to the next delta cycle of the HDL simulation.

In block 304, the system determines whether there are more assignments to process for the current delta cycle, e.g., the system determines whether an assignment for the current delta is detected. If so, method 300 continues to block 310. If not, method 300 proceeds to block 306.

In block 306, in response to determining that there are no further assignments to process for the current delta cycle, the system adds the event list to the event queue for processing. The system adds each event of the event list to the event queue. For example, the scheduler is capable of adding the events of the event list to the event queue. At some point, e.g., when the events for the current delta are scheduled, the events that have been added to the event queue can be executed.

After block 306, method 300 continues to block 308. In block 308, the system selects the next delta cycle of the HDL simulation as the current delta cycle. After block 308, method 300 loops back to block 302 to start processing assignments for the current delta cycle.

Continuing with block 310, the system selects an assignment for a signal. The system selects an assignment for a signal for the current delta cycle. As discussed, the current delta cycle may have one or more assignments that are to occur. Further, the assignments for the current delta cycle may be for one or more different signals of the HDL design. In block 312, the system determines whether the selected assignment, e.g., the assignment selected in block 310, is the first assignment for the signal in the current delta cycle.

For example, the system determines whether another assignment for the same signal (e.g., signal "5") to which the assignment selected in block 310 corresponds has been processed in the current delta cycle resulting in an event for signal "s" in the event list. If the assignment is the first for the signal "s" in the current delta cycle, the event list includes no events corresponding to signal "s". If the assignment is the first for the signal, method 300 continues to block 314. If not, method 300 proceeds to block 316.

In block 314, since the selected assignment is the first assignment in the current delta cycle for the signal, the system creates an event for the assignment and adds the event to the event list. The system creates the event as a data structure that specifies the signal (e.g., the signal name such as "5"), a start offset, a size, and a value as previously described herein. Since the assignment is the first assignment in the current delta cycle for the signal, there is no event in the event list for the signal for purposes of merging. As such, the system need not undertake a search of the event list for other events that may be merged with the newly created event. Accordingly, after block 314, method 300 loops back to block 304 to continue processing assignments for the current delta cycle.

In block 316, the system selects an event from the event list. The selected event is an event for the same signal as the selected assignment. For purposes of comparing the selected assignment with events in the event list for merging, the selected assignment may only be evaluated against events for the same signal as the selected assignment. Thus, in block 316, the system effectively filters the event list so that only an event for the same signal, e.g., "s", as the selected assignment may be selected.

In block 318, the system determines whether the bit range of the selected assignment is within the bit range of the selected event. More particularly, the system determines whether the start index of the selected assignment is greater than or equal to the start index of the selected event and whether the end index of the selected assignment is less than or equal to the end index of the selected event. If both of the conditions for the start index and the end index are met, the system determines that the range of the selected assignment is within the range of the selected event.

For example, consider the case where the selected assignment is for a signal "s" and has a start index of 2 and an end index of 4. The system determines that the selected assignment is within the bit range of the selected event if the selected event is for the signal "s" and has a start index of 2 or less and an end index of 4 or more. By comparison, the system determines that the selected assignment is not within the bit range of the selected event if the start index of the selected event is 3 or more or the end index of the selected event is 3 or less.

In response to determining that the bit range of the selected assignment is within the bit range of the selected event, method 300 continues to block 320. In block 320, the system updates the selected event to include the selected assignment. In particular embodiments, the updated event is referred to as a merged event. As previously noted, the most recently executed assignment controls the value of any overlapping bits. Since the bit range of the selected assignment is entirely within the bit range of the selected event, the values of the bits of the selected event are updated to the values of the corresponding bits of the selected assignment.

As an illustrative and non-limiting example, consider the case where the selected assignment for signal "s" assigns the values "11" to bits 2 and 3. The selected event may specify values for bits 2, 3, 4, and 5 of signal "s" as "0011". In this example, bits 2 and 3 of signal "s" of the selected event are updated with the values of bits 2 and 3 from the selected assignment. Accordingly, the selected event, e.g., the merged event after the updating, specifies a value of "1111" for bits 2, 3, 4, and 5 of signal "s" after block 320. After block 320, method 300 loops back to block 304 to continue processing assignments for the current delta cycle.

Continuing with block 322 in the case where the range of the selected assignment is not within the range of the selected event, the system determines whether the range of the selected assignment overlaps or is adjacent to the range of the selected event.

The system is capable of detecting an overlap condition in ranges when the start index (end index) of the selected assignment is between the start index and the end index of the selected event, and the end index (start index) of the selected assignment is outside of the range of the selected event. An example of an overlapping bit range is where the start index of the selected assignment is 2, the end index of the selected assignment is 4, the start index of the selected event is 3 and the end index of the selected event is 5. In this example, the start index of the selected assignment is between the start index and the end index of the selected event.

Another example of an overlapping bit range is where the start index of the selected assignment is 2, the end index of the selected assignment is 4, the start index of the selected event is 1, and the end index of the selected event is 3. In this example, the end index of the selected assignment is between the start index and the end index of the selected event.

Another example of an overlapping bit range is where the bit range of the selected event is within the bit range of the selected assignment. For example, the system determines that an overlap condition exists given a start index of the selected assignment and an end index of the selected assignment, when the start index of the selected event is greater than or equal to the start index of the selected assignment and less than the end index of the selected assignment, and the end index of the selected event is greater than or equal to the start index of the selected event and less than or equal to the end index of the selected assignment. For example, the start index of the selected event is 4, the end index of the selected event is 6, the start index of the selected assignment is 3, and the end index of the selected assignment is 7.

The system determines that ranges are adjacent, e.g., meet the adjacency condition, when the range of the selected assignment does not overlap with the range of the selected event, but no bit separates the range of the selected assignment from the range of the selected event. For example, the bit range of the selected assignment and the bit range of the selected event, when concatenated, form a contiguous bit range. The system is capable of detecting the adjacency condition when the start index of the selected event (selected assignment) is one greater than the end index of the selected assignment (selected event) or the end index of the selected event (selected assignment) is one below the start index of the selected assignment (selected event).

An example of adjacent bit ranges is where the start index of the selected assignment is 2, the end index of the selected assignment is 4, the start index of the selected event is 5, and the end index of the selected event is 6. Another example of an adjacent bit range is where the start index of the selected assignment is 5, the end index of the selected assignment is 7, the start index of the selected event is 2, and the end index of the selected event is 4.

In response to determining that the bit range of the selected assignment overlaps or is adjacent to the bit range of the selected event, method 300 continues to block 324. In block 324, the system creates a merged event. In one or more embodiments, the system modifies the selected event to generate the merged event. The system determines the range of the merged event to be the union of the range of the selected assignment and the range of the selected event.

In the case of an overlapping range, the system generates the merged event to have a different start index and/or a different end index compared to the selected event. For example, in the case where the start index of the selected assignment is 2, the end index of the selected assignment is 4, the start index of the selected event is 3, and the end index of the selected event is 5, the system generates the merged event to have a start index of 2 and an end index of 5. Continuing with the example, if the value of bits 2, 3, and 4 of the selected assignment is "111" and the value of bits 3, 4, and 5 of the selected event is "000", the system generates the merged event with bits 2, 3, 4, and 5 having a value of "1110".

In another example, in the case where the start index of the selected assignment is 2, the end index of the selected assignment is 4, the start index of the selected event is 1, and the end index of the selected event is 3, the system generates the merged event to have a start index of 1 and an end index of 4. Continuing with the example, if the value of bits 2, 3, and 4 of the selected assignment is "111" and the value of bits 1, 2, and 3 of the selected event is "000", the system generates the merged event with bits 1, 2, 3, and 4 having a value of "0111".

In another example, in the case where the start index of the selected assignment is 3, the end index of the selected assignment is 7, the start index of the selected event is 4, and the end index of the selected event is 6, the system generates the merged event to have a start index of 3 and an end index of 7. Continuing with the example, if the bit range of the selected event is within the bit range of the selected assignment, the value of the merged event is the value of the selected assignment.

In the case of adjacent ranges, the system generates the merged event to have a start index or an end index that differs from the respective index of the selected event. For example, in the case where the start index of the selected assignment is 2, the end index of the selected assignment is 4, the start index of the selected event is 5, and the end index of the selected event is 6, the system generates the merged event with a start index of 2 and an end index of 6. In the case of adjacent bit ranges, the system is capable of concatenating the value of the selected assignment with the value of the selected event to generate the value of the merged event. In another example, in the case where the start index of the selected assignment is 5, the end index of the selected assignment is 7, the start index of the selected event is 2 and the end index of the selected assignment is 4, the system generates the merged event to have a start index of 2 and the end index of 7.

Continuing with block 326, where the system determines that the range of the selected assignment does not overlap and is not adjacent to the range of the selected event, the system determines whether there are more events left to process in the event list for the same signal as the merged event. If so, method 300 loops back to block 316 to select a next event from the event list to process and compare with the selected assignment. If not, method 300 continues to block 328.

In block 328, the system creates an event for the selected assignment and adds the event to the event list. The system creates an event for the selected assignment in the event list because the system has determined that the selected assignment may not be used to create a merge event given the events currently in the event queue. Accordingly, the system creates an event for the selected assignment. After block 328, method 300 loops back to block 304 to continue processing assignments for the current delta cycle.

After block 324, method 300 continues to block 330. After creating a merged event that has a start index that differs from the start index of the selected event and/or an end index that differs from the end index of the selected event, the system continues to compare the merged event with remaining events for the same signal within the event list. The system performs further merges as may be required.

Accordingly, in block 330, the system selects a next event in the event list. The system selects a next event for purposes of analysis to determine whether the selected event may be merged with the merged event created in block 324. As discussed, the system effectively filters the events according to signal. As such, the system selects the next event from the event list for the same signal as the merged event.

In block 332, the system determines whether the bit range of the merged event is within the bit range of the next event. For example, the system performs an analysis of the merged event and the next event as generally described in connection with block 318 by evaluating the start index and the end index of the merged event and the start index and the end index of the next event. If the range of the merged event is within the range of the next event, method 300 continues to block 334. If not, method 300 continues to block 336.

In block 334, the system updates the merged event and deletes the next event. For example, the system updates the start index of the merged event to be equal to the start index of the next event. The system further is capable of updating the end index of the merged event to be equal to the end index of the next event. The system maintains the values of the bit positions of the merged event and updates any additional bit positions of the expanded merged event (e.g., if there are different bit positions) with the values from the next event. The system is capable of then deleting the next event.

For example, consider a merged event having a start index of 2, an end index of 4, and bit values of "111" for bits 2, 3, and 4. The next event can have a start index of 2, an end index of 5, and bit values of "0000" for bits 2, 3, 4, and 5. Block 334 updates the merged event to have a start index of 2, an end index of 5, and a value for bits 2, 3, 4, and 5 of "1110". In the case where the merged event and the next event have same start indexes and same end indexes, the system may keep the merged event as is and delete the next event. After block 334, method 300 loops back to block 304 to process further assignments.

Continuing with block 336, in the case where the bit range of the merged event is not within the bit range of the next event, the system determines whether the bit range of the merged event overlaps or is adjacent to the bit range of the next event. For example, the system is capable of performing an analysis of start indexes and end indexes of the merged event and the next event as generally described in connection with block 322. In response to determining that the range of the merged event overlaps or is adjacent to the range of the next event, method 300 continues to block 338.

In block 338, the system updates the merged event and deletes the next event. For example, the system is capable of performing an update process as generally described with reference to block 324. In the case of overlapping ranges, the system updates the start index and/or the end index to coincide with the start index and/or end index of the next event as the case may be. As an illustrative and non-limiting example, when the start index of the merged event is 2, the end index of the merged event is 4, the start index of the next event is 3, and the end index of the next assignment is 5, the system updates the merged event to have a start index of 2 and an end index of 5. Continuing with the example, if the value of bits 2, 3, and 4 of the merged event is "111" and the value of bits 3, 4, and 5 of the next event is "000", the system updates the merged event so that bits 2, 3, 4, and 5 have the value "1110".

In another example, in the case where the start index of the merged event is 2, the end index of the merged event is 4, the start index of the next event is 1, and the end index of the next event is 3, the system updates the merged event to have a start index of 1 and an end index of 4. Continuing with the example, if the value of bits 2, 3, and 4 of the merged event is "111" and the value of bits 1, 2, and 3 of the next event is "000", the system updates the merged event so that bits 1, 2, 3, and 4 have the value "0111".

In the case of adjacent ranges, the system updates at least one of the start index or the end index of the merged event. For example, in the case where the start index of the merged event is 2, the end index of the merged event is 4, the start index of the next event is 5, and the end index of the next event is 6, the system updates the merged event to have a start index of 2 and an end index of 6. In the case of adjacent ranges, the system updates the value of the merged event by concatenating the value of the merged event with the value of the next event. In another example, in the case where the start index of the merged event is 5, the end index of the merged event is 7, the start index of the next event is 2, and the end index of the next event is 4, the system updates the merged event to have a start index of 2 and the end index of 7. Again, the values of the merged event and the next event are concatenated to generate the value of bits 2, 3, 4, 5, 6, and 7 of the merged event.

In block 340, the system determines whether there are more events in the event list. More particularly, the system determines whether there are more events in the event list for the signal of the merged event. If so, method 300 continues to block 330 to continue comparing the merged event with further events in the event list. If not, then the system has checked the merged event against each event in the event list for the same signal and method 300 loops back to block 304 to process further assignments.

Method 300 illustrates an example method of operation for scheduling events during runtime of an HDL simulation. As described, the system is capable of merging events scheduled for the same delta cycle for a signal when particular conditions are met. Since the number of events for a given delta cycle often numbers in the thousands, tens of thousands, or even hundreds of thousands, merging events to reduce the number of events that are scheduled during delta cycles can significantly improve, e.g., speed up, runtime performance of the HDL simulator.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise. As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. Memory, as described herein, is an example of a computer readable storage medium. A non-exhaustive list of more specific examples of a computer readable storage medium may include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

As defined herein, the terms "one embodiment," "an embodiment," "one or more embodiments," or similar language mean that a particular feature, structure, or characteristic described in connection with the embodiment is included in at least one embodiment described within this disclosure. Thus, appearances of the phrases "in one embodiment," "in an embodiment," "in one or more embodiments," and similar language throughout this disclosure may, but do not necessarily, all refer to the same embodiment.

As defined herein, the term "processor" means at least one hardware circuit configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, a graphics processing unit (GPU), a controller, and so forth.

As defined herein, the term "real time" means a level of processing responsiveness that a user or system senses as sufficiently immediate for a particular process or determination to be made, or that enables the processor to keep up with some external process. As defined herein, the term "user" means a human being.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

One or more embodiments are directed to methods for simulating a circuit design. In one aspect, a method can include detecting, using a processor, an assignment for a signal of a circuit design during a delta cycle of a simulation of the circuit design, comparing, using the processor, a range of the assignment for the signal with a range of an existing event for the signal for the delta cycle, and, in response to determining that the range of the assignment for the signal and the range of the existing event meet a condition, updating, using the processor, the existing event resulting in a merged event. The method can also include scheduling, using the processor, the merged event for execution for the delta cycle.

In an aspect, the method includes executing the merged event.

In another aspect, the condition specifies that the range of the assignment is within the range of the existing event. Accordingly, the updating can include updating at least one bit of the existing event with a value of the assignment.

In another aspect, the condition specifies that the range of the assignment is adjacent to or overlaps with the range of the existing event. Accordingly, the updating can include creating the merged event by modifying at least one of a start index of the range of the existing event to correspond to a start index of the range of the assignment or an end index of the range of the existing event to correspond with an end index of the assignment, wherein the creating the merged event further comprises updating a value of the existing event with a value of the assignment.

In another aspect, the merged event has a range that is different from the range of the existing event. Accordingly, the method can include comparing the merged event with a next event for the signal for the delta cycle and, in response to determining that the range of the merged event is adjacent to, or overlaps with, a range of the next event for the signal for the delta cycle, updating the merged event based upon the next event and deleting the next event.

In another aspect, the merged event has a range that is different from the range of the existing event. Accordingly, the method can include comparing the merged event with a next event for the signal for the delta cycle and, in response to determining that the range of the merged event is within a range of the next event for the signal for the delta cycle, updating the merged event and deleting the next event.

In another aspect, the method can include comparing a further assignment for the signal with a further existing event for the signal for the delta cycle and, in response to determining that a range of the further assignment for the signal and a range of the further existing event are disjoint, creating a new event for the further assignment for the signal for the delta cycle.

In another aspect, the further existing event is the merged event.

One or more embodiments are directed to systems for simulating a circuit design. In one aspect, a system includes a memory configured to store program code and a processor coupled to the memory. The processor, in response to executing the program code, is configured to initiate operations. The operations include detecting an assignment for a signal of a circuit design during a delta cycle of a simulation of the circuit design, comparing a range of the assignment for the signal with a range of an existing event for the signal for the delta cycle, and, in response to determining that the range of the assignment for the signal and the range of the existing event meet a condition, updating the existing event resulting in a merged event. The operations further can include scheduling the merged event for execution for the delta cycle.

In an aspect, the processor is configured to initiate further operations including executing the merged event.

In another aspect, the condition specifies that the range of the assignment is within the range of the existing event. Accordingly, the updating can include updating at least one bit of the existing event with a value of the assignment.

In another aspect, the condition specifies that the range of the assignment is adjacent to or overlaps with the range of the existing event. Accordingly, the updating can include creating the merged event by modifying at least one of a start index of the range of the existing event to correspond to a start index of the range of the assignment or an end index of the range of the existing event to correspond with an end index of the assignment, wherein the creating a merged event further comprises updating a value of the existing event with a value of the assignment.

In another aspect, the merged event has a range that is different from the range of the existing event. Accordingly, the processor can be configured to initiate further operations including comparing the merged event with a next event for the signal for the delta cycle and, in response to determining that the range of the merged event is adjacent to, or overlaps with, a range of the next event for the signal for the delta cycle, updating the merged event based upon the next event and deleting the next event.

In another aspect, the merged event has a range that is different from the range of the existing event. Accordingly, the processor is configured to initiate further operations including comparing the merged event with a next event for the signal for the delta cycle and, in response to determining that the range of the merged event is within a range of the next event for the signal for the delta cycle, updating the merged event and deleting the next event.

In another aspect, the processor is configured to initiate further operations including comparing a further assignment for the signal with a further existing event for the signal for the delta cycle and, in response to determining that a range of the further assignment for the signal and a range of the further existing event are disjoint, creating a new event for the further assignment for the signal for the delta cycle.

In another aspect, the further existing event is the merged event.

One or more embodiments are directed to computer program products for simulating a circuit design. In one aspect, a computer program product includes a computer readable storage medium having program code stored thereon. The program code is executable by a processor to perform operations including detecting, using the processor, an assignment for a signal of a circuit design during a delta cycle of a simulation of the circuit design, comparing, using the processor, a range of the assignment for the signal with a range of an existing event for the signal for the delta cycle, and, in response to determining that a range of the assignment for the signal and the range of the existing event meet a condition, updating, using the processor, the existing event resulting in a merged event. The operations can also include scheduling, using the processor, the merged event for execution for the delta cycle.

In an aspect, the program code is executable by a processor to perform operations further including executing the merged event.

In another aspect, the condition specifies that the range of the assignment is within the range of the existing event. Accordingly, the updating can include updating at least one bit of the existing event with a value of the assignment.

In another aspect, the condition specifies that the range of the assignment is adjacent to or overlaps with the range of the existing event. Accordingly, the updating can include creating the merged event by modifying at least one of a start index of the range of the existing event to correspond to a start index of the range of the assignment or an end index of the range of the existing event to correspond with an end index of the assignment, wherein the creating a merged event further comprises updating a value of the existing event with a value of the assignment.

In another aspect, the merged event has a range that is different from the range of the existing event. Accordingly, the program code is executable by a processor to perform operations further including comparing the merged event with a next event for the signal for the delta cycle and, in response to determining that the range of the merged event is adjacent to, or overlaps with, a range of the next event for the signal for the delta cycle, updating the merged event based upon the next event and deleting the next event.

In another aspect, the merged event has a range that is different from the range of the existing event. Accordingly, the program code is executable by a processor to perform operations further including comparing the merged event with a next event for the signal for the delta cycle and, in response to determining that the range of the merged event is within a range of the next event for the signal for the delta cycle, updating the merged event and deleting the next event.

In another aspect, the program code is executable by a processor to perform operations further including comparing a further assignment for the signal with a further existing event for the signal for the delta cycle and, in response to determining that a range of the further assignment for the signal and a range of the further existing event are disjoint, creating a new event for the further assignment for the signal for the delta cycle.

In another aspect, the further existing event is the merged event.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method for simulating a circuit design, comprising:
   detecting, using a processor, an assignment for a signal of a circuit design during a delta cycle of a simulation of the circuit design;
   comparing, using the processor, a range of the assignment for the signal with a range of an existing event for the signal for the delta cycle;
   in response to determining that the range of the assignment for the signal and the range of the existing event meet a condition, updating, using the processor, the existing event resulting in a merged event; and
   scheduling, using the processor, the merged event for execution for the delta cycle.

2. The method of claim 1, further comprising:
   executing the merged event.

3. The method of claim 1, wherein the condition specifies that the range of the assignment is within the range of the existing event, wherein the updating comprises:
   updating at least one bit of the existing event with a value of the assignment.

4. The method of claim 1, wherein the condition specifies that the range of the assignment is adjacent to or overlaps with the range of the existing event, wherein the updating comprises:
   creating the merged event by modifying at least one of a start index of the range of the existing event to correspond to a start index of the range of the assignment or an end index of the range of the existing event to correspond with an end index of the range of the assignment, wherein the creating the merged event further comprises updating a value of the existing event with a value of the assignment.

5. The method of claim 1, wherein the merged event has a range that is different from the range of the existing event, the method further comprising:
   comparing the merged event with a next event for the signal for the delta cycle; and
   in response to determining that the range of the merged event is adjacent to, or overlaps with, a range of the next event for the signal for the delta cycle, updating the merged event based upon the next event and deleting the next event.

6. The method of claim 1, wherein the merged event has a range that is different from the range of the existing event, the method further comprising:
   comparing the merged event with a next event for the signal for the delta cycle; and
   in response to determining that the range of the merged event is within a range of the next event for the signal for the delta cycle, updating the merged event and deleting the next event.

7. The method of claim 1, further comprising:
   comparing a further assignment for the signal with a further existing event for the signal for the delta cycle; and
   in response to determining that a range of the further assignment for the signal and a range of the further existing event are disjoint, creating a new event for the further assignment for the signal for the delta cycle.

8. The method of claim 7, wherein the further existing event is the merged event.

9. A system for simulating a circuit design, comprising:
   a memory configured to store program code; and
   a processor coupled to the memory, wherein the processor, in response to executing the program code, is configured to initiate operations including:
   detecting an assignment for a signal of a circuit design during a delta cycle of a simulation of the circuit design;
   comparing a range of the assignment for the signal with a range of an existing event for the signal for the delta cycle;
   in response to determining that the range of the assignment for the signal and the range of the existing event meet a condition, updating the existing event resulting in a merged event; and
   scheduling the merged event for execution for the delta cycle.

10. The system of claim 9, wherein the processor is configured to initiate further operations comprising:
    executing the merged event.

11. The system of claim 9, wherein the condition specifies that the range of the assignment is within the range of the existing event, wherein the updating comprises:
    updating at least one bit of the existing event with a value of the assignment.

12. The system of claim 9, wherein the condition specifies that the range of the assignment is adjacent to or overlaps with the range of the existing event, wherein the updating comprises:
creating the merged event by modifying at least one of a start index of the range of the existing event to correspond to a start index of the range of the assignment or an end index of the range of the existing event to correspond with an end index of the range of the assignment, wherein the creating a merged event further comprises updating a value of the existing event with a value of the assignment.

13. The system of claim 9, wherein the merged event has a range that is different from the range of the existing event, wherein the processor is configured to initiate further operations comprising:
comparing the merged event with a next event for the signal for the delta cycle; and
in response to determining that the range of the merged event is adjacent to, or overlaps with, a range of the next event for the signal for the delta cycle, updating the merged event based upon the next event and deleting the next event.

14. The system of claim 9, wherein the merged event has a range that is different from the range of the existing event, wherein the processor is configured to initiate further operations comprising:
comparing the merged event with a next event for the signal for the delta cycle; and
in response to determining that the range of the merged event is within a range of the next event for the signal for the delta cycle, updating the merged event and deleting the next event.

15. The system of claim 9, wherein the processor is configured to initiate further operations comprising:
comparing a further assignment for the signal with a further existing event for the signal for the delta cycle; and
in response to determining that a range of the further assignment for the signal and a range of the further existing event are disjoint, creating a new event for the further assignment for the signal for the delta cycle.

16. The system of claim 15, wherein the further existing event is the merged event.

17. A computer program product comprising a computer readable storage medium having program code stored thereon, the program code executable by a processor to perform operations for simulating a circuit design, comprising:
detecting, using the processor, an assignment for a signal of a circuit design during a delta cycle of a simulation of the circuit design;
comparing, using the processor, a range of the assignment for the signal with a range of an existing event for the signal for the delta cycle;
in response to determining that the range of the assignment for the signal and the range of the existing event meet a condition, updating, using the processor, the existing event resulting in a merged event; and
scheduling, using the processor, the merged event for execution for the delta cycle.

18. The computer program product of claim 17, wherein the program code is executable by a processor to perform operations further comprising:
executing the merged event.

19. The computer program product of claim 17, wherein the condition specifies that the range of the assignment is within the range of the existing event, wherein the updating comprises:
updating at least one bit of the existing event with a value of the assignment.

20. The computer program product of claim 17, wherein the condition specifies that the range of the assignment is adjacent to or overlaps with the range of the existing event, wherein the updating comprises:
creating the merged event by modifying at least one of a start index of the range of the existing event to correspond to a start index of the range of the assignment or an end index of the range of the existing event to correspond with an end index of the range of the assignment, wherein the creating the merged event further comprises updating a value of the existing event with a value of the assignment.

\* \* \* \* \*